US007905089B2

(12) United States Patent
Ma et al.

(10) Patent No.: US 7,905,089 B2
(45) Date of Patent: Mar. 15, 2011

(54) ACTUATOR CONTROL SYSTEM IMPLEMENTING ADAPTIVE FLOW CONTROL

(75) Inventors: Pengfei Ma, Naperville, IL (US); Chad Timothy Brickner, Aurora, IL (US); Tonglin Shang, Bolingbrook, IL (US); Vlad Petru Patrangenaru, Schaumburg, IL (US)

(73) Assignee: Caterpillar Inc., Peoria, IL (US)

( * ) Notice: Subject to any disclaimer, the term of this patent is extended or adjusted under 35 U.S.C. 154(b) by 672 days.

(21) Appl. No.: 11/898,608

(22) Filed: Sep. 13, 2007

(65) Prior Publication Data

US 2009/0071144 A1 Mar. 19, 2009

(51) Int. Cl.
*F16D 31/02* (2006.01)

(52) U.S. Cl. ............................................ 60/422; 60/452

(58) Field of Classification Search .................... 60/422, 60/452

See application file for complete search history.

(56) References Cited

U.S. PATENT DOCUMENTS 4,074,529 A 2/1978 Budzich
4,139,987 A 2/1979 Budzich
4,934,143 A 6/1990 Ezell et al.
5,129,230 A 7/1992 Izumi et al.
5,138,838 A 8/1992 Crosser
5,245,828 A * 9/1993 Nakamura ...................... 60/452
5,630,317 A 5/1997 Takamura et al.
6,030,183 A 2/2000 Childress
6,033,188 A 3/2000 Baldus et al.
6,131,391 A 10/2000 Poorman
6,209,322 B1 4/2001 Yoshida et al.
6,658,843 B1 12/2003 Kauss
6,874,526 B2 4/2005 Koetter
6,978,607 B2 12/2005 Matsumoto et al.
2006/0099081 A1 5/2006 Toda et al.
2006/0230753 A1 10/2006 Hesse et al.
2007/0006580 A1 1/2007 Hesse

FOREIGN PATENT DOCUMENTS

EP 0 462 589 B1 4/1995
EP 487902 * 4/1997
EP 0 487 902 B1 6/1997
EP 1696136 8/2006

* cited by examiner

*Primary Examiner* — F. Daniel Lopez
(74) *Attorney, Agent, or Firm* — Finnegan, Henderson, Farabow, Garrett & Dunner LLP

(57) ABSTRACT

An actuator control system is disclosed. The actuator control system may have a pump and at least one actuator. The actuator control system may further have an actuator valve configured to control the at least one actuator. The actuator control system may also have a pump pressure sensor configured to determine a pump pressure value and a load pressure sensor configure to determine a load pressure value. The actuator control system may additionally have a controller configured to receive the pump pressure value and the load pressure value. The controller may further be configured to compare the pump pressure value and the load pressure value, and selectively implement a primary control strategy and a secondary control strategy based on the comparison.

18 Claims, 3 Drawing Sheets

ACTUATOR CONTROL SYSTEM IMPLEMENTING ADAPTIVE FLOW CONTROL

TECHNICAL FIELD

The present disclosure relates generally to a control system and, more particularly, to an actuator control system that implements adaptive flow control.

BACKGROUND

Machines such as, for example, excavators, loaders, dozers, motor graders, and other types of heavy equipment use multiple actuators supplied with hydraulic fluid from an engine-driven pump to accomplish a variety of tasks. These actuators are typically pilot controlled such that, as an operator moves an input device, for example a joystick, an amount of pilot fluid is directed to a control valve to move the control valve. As the control valve is moved, a proportional amount of fluid is directed from the pump to the actuators. Various hydraulic control strategies have been implemented to control the amount of fluid flow between the pump and the actuators, including a load sensing control strategy. Load sensing control strategies measure a pressure differential between a maximum load pressure of a plurality of actuators and a pump delivery pressure. A controller typically receives the pressure differential data and controls a displacement of the pump to deliver the maximum load demand. More specifically, load sensing control systems attempt to control pump displacement to maintain a desired buffer pressure between pump delivery pressure and the maximum load pressure. Since variable displacement pumps are known to react slowly to load pressure changes, the pump is typically controlled to deliver fluid at an excessive pressure to ensure the maximum load pressure is available to the actuators. Hence, the pump is often required to deliver more pressure than necessary to overcome its own slow response to load demands.

One example of such a load sensing control system has been described in U.S. Pat. No. 5,129,230 (the '230 patent) to Izumi et al. Specifically, the '230 patent discloses a hydraulic control system implementing a variable displacement pump, two cylinders, two control valves, and an unloading valve. Additionally, the '230 patent discloses a load pressure sensor for sensing the maximum load from the two cylinders, and a pump swash-plate position detector. Based on the sensed values from the load pressure sensor and the swash-plate position detector, a pressure difference between the pump and the maximum load is determined and transmitted to a controller. The controller instructs the variable displacement pump to deliver an excessive amount of pressure to ensure that the pump delivery pressure is greater than the maximum load pressure. An unloading valve is positioned between the pump and the control valves for holding the differential pressure less than a setting value. As a result, the '230 patent is able to control a delivery rate of the pump when there are small or large pressure differences between the pump and the maximum loads.

Although load sensing pump control may, by itself, be adequate for some situations, at time it may be limited and inefficient. That is, pump control may be slow to respond to changes in required load pressure. And, pump control systems must maintain a relatively high amount of pressure differential to ensure that pump pressure is sufficient to meet the needs of the maximum load. These high pressures may place an unnecessary strain on the machine, whereby causing the pump to be overworked and the power source to inefficiently use fuel.

The disclosed actuator control system is directed to overcoming one or more of the problems set forth above.

SUMMARY OF THE INVENTION

In one aspect, the present disclosure is directed to an actuator control system. The actuator control system may include a pump and at least one actuator. The actuator control system may further include an actuator valve configured to control the at least one actuator. The actuator control system may also include a pump pressure sensor configured to determine a pump pressure value, and a load pressure sensor configure to determine a load pressure value. The actuator control system may additionally include a controller configured to receive the pump pressure value and the load pressure value. The controller may further be configured to compare the pump pressure value and the load pressure value, and selectively implement a primary control strategy and a secondary control strategy based on the comparison.

In another aspect, the present disclosure is directed to a method of controlling an actuator. The method may include sensing a pump pressure value and sensing a load pressure value. The method may further include comparing the pump pressure value and the load pressure value. The method may also include selectively implementing a primary control strategy and a secondary control strategy based on the comparison.

DETAILED DESCRIPTION

Figure 1:
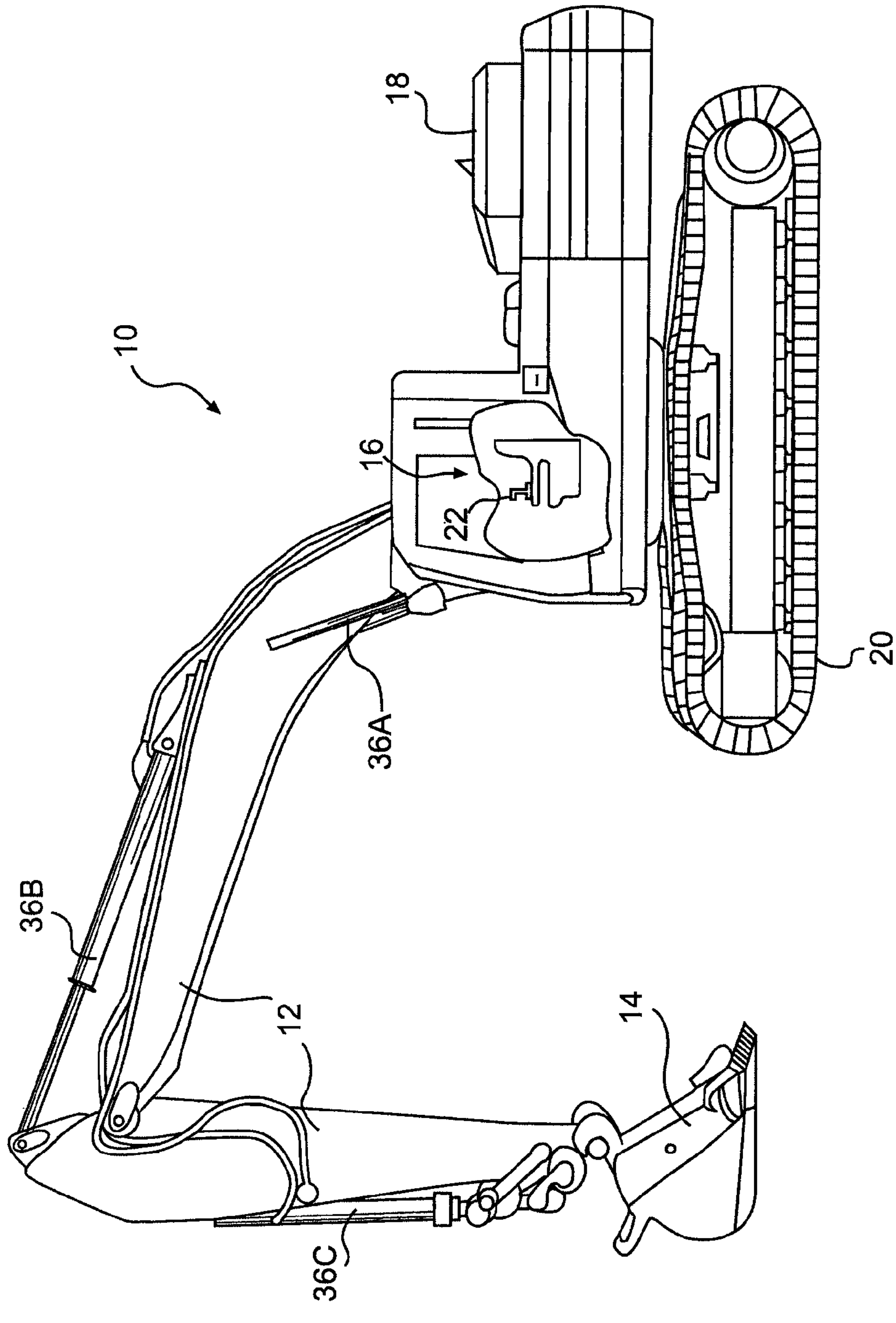
FIG. 1 is a side-view diagrammatic illustration of an exemplary disclosed machine.

FIG. 1 illustrates an exemplary machine 10. Machine 10 may be a fixed or mobile machine that performs some type of operation associated with an industry such as mining, construction, farming, transportation, or any other industry known in the art. For example, machine 10 may be an earth moving machine such as an excavator, a dozer, a loader, a backhoe, a motor grader, a dump truck, or any other earth moving machine. Machine 10 may include a frame 12, at least one work implement 14, an operator station 16, a power source 18, and at least one traction device 20. Power source 18 may drive the motion of traction device 20 and work implement 14 in response to commands received via operating station 16.

Frame 12 may include any structural unit that supports movement of machine 10 and/or work implement 14. Frame 12 may be, for example, a stationary base frame connecting power source 18 to traction device 20, a movable frame member of a linkage system, or any other frame known in the art.

Work implement 14 may include any device used in the performance of a task. For example, work implement 14 may include a bucket, a blade, a shovel, a ripper, a dump bed, a hammer, an auger, or any other suitable task-performing device. Work implement 14 may be configured to pivot, rotate, slide, swing, or move relative to frame 12 in any other manner known in the art.

Operator station 16 may be positioned on machine 10 and include an operator interface device 22. Operator interface device 22 may be configured to receive input from a machine operator indicative of a desired machine movement. It is contemplated that the input could alternately be a computer generated command from an automated system that assists the operator, or an autonomous system that operates in place of the operator. Operator interface device 22 may include a multi-axis joystick and be a proportional-type controller configured to position and/or orient work implement 14, wherein a movement speed of work implement 14 is related to an actuation position of operator interface device 22 about an actuation axis. It is contemplated that additional and/or different operator interface devices may be included within operator interface station 16 such as, for example, wheels, knobs, push-pull devices, switches, and other operator interface devices known in the art.

Power source 18 may be an engine such as, for example, a diesel engine, a gasoline engine, a natural gas engine, or any other engine known in the art. It is contemplated that power source 18 may alternatively be another source of power such as a fuel cell, a power storage device, and electric motor, or another source of power known in the art.

Traction device 20 may include tracks located on each side of machine 10 (only one side shown). Alternately, traction device 20 may include wheels, belts, or other traction devices. Traction device 20 may or may not be steerable.

Figure 2:
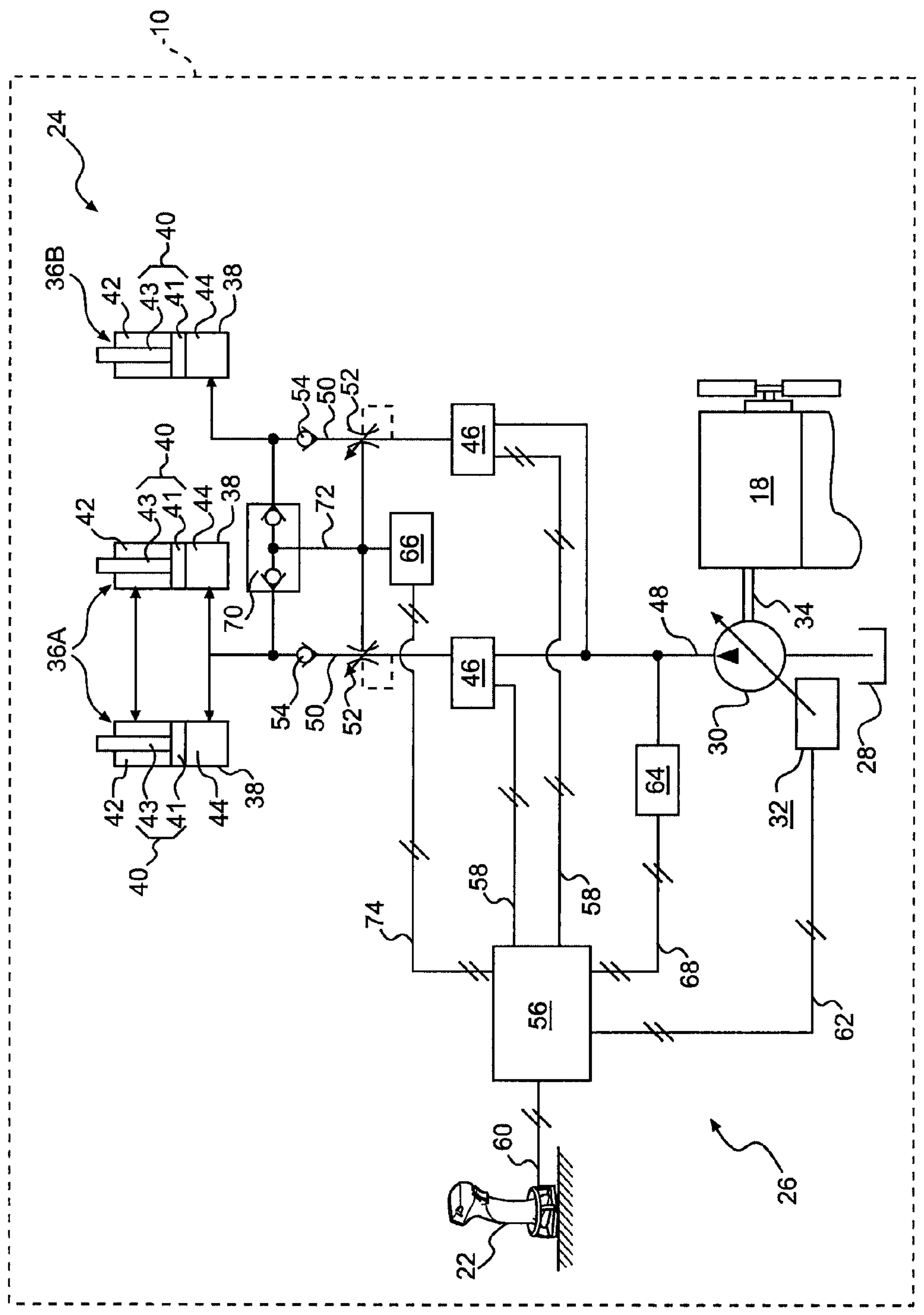
FIG. 2 is a schematic illustration of an exemplary disclosed hydraulic control system for use with the machine of FIG. 1.

As illustrated in FIG. 2, machine 10 may include a hydraulic system 24 having a plurality of fluid components that cooperate to move work implement 14 (referring to FIG. 1) and/or to propel machine 10. Specifically, hydraulic system 24 may include a tank 28 holding a supply of fluid, a pump 30 configured to pressurize the fluid and to direct the pressurized fluid to one or more hydraulic cylinders 36A-C (only cylinders 36A and 36B are shown in FIG. 2), one or more fluid motors (not shown), and/or to any other additional fluid actuator known in the art. Hydraulic system 24 may also include a control system 26 in communication with the fluid components of hydraulic system 24. It is contemplated that hydraulic system 24 may include additional and/or different components such as, for example, accumulators, restrictive orifices, pressure relief valves, makeup valves, pressure-balancing passageways, and other components known in the art.

Tank 28 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 28. It is also contemplated that hydraulic system 24 may be connected to multiple separate fluid tanks.

Pump 30 may be configured to produce a flow of pressurized fluid and may include, for example, a variable displacement pump, a fixed displacement pump, or a variable delivery pump. Pump 30 may be drivably connected to power source 18 of machine 10 by, for example, a countershaft 34, a belt (not shown), an electrical circuit (not shown), or in any other suitable manner. Alternatively, pump 30 may be indirectly connected to power source 18 via a torque converter, a gear box, or in any other appropriate manner. Pump 30 may vary displacement and/or delivery of hydraulic fluid. For example, a variable displacement pump may include an adjustable swash-plate (not shown) that may be electronically controlled based on operator input signals from operator input device 22 and/or machine input signals from various machine sensors (not shown) to allow variable control of pump output. It is contemplated that multiple pumps may be interconnected to supply pressurized fluid to hydraulic system 24.

A flow rate available from pump 30 may be determined by sensing an angle of a swash-plate within pump 30 or by observing an actual command sent to pump 30. It is contemplated that the flow rate available from pump 30 may alternatively be determined by a sensing device configured to measure an actual flow output from pump 30. A flow rate available from pump 30 may be reduced or increased for various reasons such as, for example, to ensure that demanded pump power does not exceed available input power (from power source 18) at high pump pressures, or to vary pressures within hydraulic system 24.

Hydraulic cylinders 36A-C may connect work implement 14 to frame 12 (referring to FIG. 1) via a direct pivot, via a linkage system with each of hydraulic cylinders 36A-C forming one member in the linkage system, or in any other appropriate manner. Each of hydraulic cylinders 36A-C may include a tube 38 and a piston assembly 40 disposed within tube 38. One of tube 38 and piston assembly 40 may be pivotally connected to frame 12, while the other of tube 38 and piston assembly 40 may be pivotally connected to work implement 14. It is contemplated that tube 38 and/or piston assembly 40 may alternatively be fixedly connected to either frame 12 or work implement 14 or connected between two or more members of frame 12. Each of hydraulic cylinders 36A-C may include a first chamber 42 and a second chamber 44 separated by piston assembly 40. First and second chambers 42, 44 may be selectively supplied with a pressurized fluid and drained of the pressurized fluid to cause piston assembly 40 to displace within tube 38, thereby changing the effective length of hydraulic cylinders 36A-C. The expansion and retraction of hydraulic cylinders 36A-C may function to assist in moving work implement 14.

Piston assembly 40 may include a piston 41 axially aligned with and disposed within tube 38, and a piston rod 43 connectable to one of frame 12 and work implement 14 (referring to FIG. 1). Piston 41 may include two opposing hydraulic surfaces, one associated with each of first chamber 42 and second chamber 44. An imbalance of force on piston assembly 40 may cause piston assembly 40 to axially move within tube 38. For example, a force resulting from a fluid pressure within first hydraulic chamber 42 acting on a first hydraulic surface being greater than a force resulting from the fluid pressure within second hydraulic chamber 44 acting on a second opposing hydraulic surface may cause piston assembly 40 to displace to increase the effective length of hydraulic cylinders 36A-C. Similarly, when the resultant second force is greater than the resultant first force, piston assembly 40 may retract within tube 38 to decrease the effective length of hydraulic cylinders 36A-C.

Each of hydraulic cylinders 36A-C may include at least one proportional control valve 46 that functions to meter pressurized fluid from pump 30 to one of first and second hydraulic chambers 42, 44, and at least one drain valve (not shown) that functions to allow fluid from the other of first and second chambers 42, 44 to drain to tank 28. Proportional control valve 46 may include a spring biased proportional valve mechanism that is solenoid actuated and configured to move between a first position, at which fluid is allowed to flow into one of first and second chambers 42, 44, and a second position, at which fluid flow is blocked from first and second chambers 42, 44. The location of the valve mechanism between the first and second positions may determine a flow rate of the pressurized fluid directed into and out of the associated first and second chambers 42, 44. The valve mechanism may be movable between the first and second positions in response to a demanded flow rate that produces a desired movement of work implement 14. The drain valve may include a spring biased valve mechanism that is solenoid actuated and configured to move between a first position at which fluid is allowed to flow from first and second chambers 42, 44, and a second position, at which fluid is blocked from flowing from first and second chambers 42, 44. It is contemplated that proportional control valve 46 and the drain valve may alternately be hydraulically actuated, mechanically actuated, pneumatically actuated, or actuated in any other suitable manner.

Pump 30 may be in fluid communication with proportional control valves 46 via a hydraulic line 48. Additionally, each proportional control valve 46 may be in communication with hydraulic cylinders 36A-C via a hydraulic line 50.

Hydraulic system 24 may also include a post compensating valve 52 and a check valve 54 associated with each hydraulic cylinder 36A-C. It is contemplated that post compensating valve 52 and check valve 54 may serve to balance the load pressure between actuators and aid load sharing. More specifically, each post compensator valve 52 may be interconnected and operate with the same pressure differential. Therefore, the maximum load pressure of any one actuator may be applied to all actuators via post compensators 54. In this manner, the velocity of all hydraulic cylinders 36A-C may be substantially evenly reduced when pump output is insufficient to meet the demands of any one hydraulic cylinder 36A-C.

Further, hydraulic system 24 may include a load sensing device 70, for example, a shuttle valve for sensing the maximum fluid pressure of cylinders 36A-C. Alternatively, load sensing device 70 may any known mechanism for identifying a maximum load pressure of a plurality of consumers.

Control system 26 may include a controller 56. Controller 56 may be embodied in a single microprocessor or multiple microprocessors that include a means for controlling an operation of hydraulic system 24. Numerous commercially available microprocessors can be configured to perform the functions of controller 56. It should be appreciated that controller 56 could readily embody a general machine microprocessor capable of controlling numerous machine functions. Controller 56 may include a memory, a secondary storage device, a processor, and any other components for running an application. Various other circuits may be associated with controller 56 such as power supply circuitry, signal conditioning circuitry, solenoid driver circuitry, and other types of circuitry.

Controller 56 may be configured to receive input from operator interface device 22 and to control the flow rate of pressurized fluid to hydraulic cylinders 36A-C in response to the input. Specifically, controller 56 may be in communication with each proportional control valve 46 of hydraulic cylinders 36A-C via communication line 58, and with operator interface device 22 via a communication line 60. Controller 56 may receive the proportional signals generated by operator interface device 22 and selectively actuate one or more of proportional control valves 46 to selectively fill the first or second actuating chambers associated with hydraulic cylinders 36A-C to produce the desired work tool movement.

Controller 56 may be in communication with a pump control device 32 via a communication line 62 and configured to change operation of pump 30 in response to a demand for pressurized fluid. Specifically, controller 56 may be configured to determine a flow rate of pressurized fluid that is required to produce machine movements desired by a machine operator (total desired flow rate) and indicated via operator interface device 22. It is contemplated that a flow map (not shown) may be stored in memory of controller 56 and provides instructions to controller 56 for determining a required pump flow rate. The flow map may provide controller 56 with a required pump flow rate necessary to meet desired machine movement by the operator based on operator input signals and various machine input signals. Operator input may include signals from operator input device 22. Machine input may include signals from position detectors (not shown) associated with control valves 46 indicating control valve position. Further, machine inputs may include signals indicative of limitations on pump 30 from other machine systems. For example, another machine signal may include a signal indicating the amount of torque available to pump 30. In particular, a torque sensor (not shown) may transmit a signal to controller 56 indicating limited power source torque available to pump 30. After receiving all operator and machine inputs, controller 56 may apply the flow map based on the input signals to send pump control device 32 a command of the required pump flow rate. Further, pump control device 32 may be electronically operated by controller 56.

Control system 26 may include two pressure sensors, a pump pressure sensor 64 and a load pressure sensor 66. Pump pressure sensor 64 may be located near pump 30 to monitor the pressure of fluid exiting pump 30. Further, pump pressure sensor 64 may be in communication with controller 56 via communication line 68 to transmit pump pressure data to controller 56. Load pressure sensor 66 may be in fluid communication with load sensing device 70 via hydraulic line 72, whereby load sensing device 70 may permit passage of hydraulic fluid at a pressure equal to the maximum of the hydraulic cylinders 36A-C. Further, load pressure sensor 66 may be in communication with controller 56 via communication line 74 to transmit the maximum load pressure data to controller 56. Alternatively, control system 26 may include a differential pressure sensor (not shown) in place of, or in addition to, pump pressure sensor 64 and load pressure sensor 66.

As determined by controller 56, a function of the difference between a measured pump pressure value and a measured load pressure value may be defined as a margin pressure value. Therefore, margin pressure may serve as a measure of the excess fluid pressure generated by the pump to ensure that the actuators have sufficient fluid pressure. It may be desirable to set a margin range value including a lower range limit value (e.g., 500 KPa) and an upper range limit value (e.g., 2000 KPa). When the margin pressure value drops below the lower range limit value, operation of control system 26 may become less stable and less reliable. When the margin pressure exceeds the upper range limit value, operation of control system 26 may become inefficient. It is contemplated that the control system 26 may implement a primary control strategy that is pump regulated when the margin pressure value is within the lower and upper range limit values. Further, it is contemplated that the control system 26 may implement a secondary control strategy that is valve regulated when the margin pressure is outside the lower and upper range limit values. In other words, the primary control strategy may be implemented, under normal operating conditions, when a pressure differential between a pump pressure and a maximum load pressure is within a preset margin range. In contrast, a secondary control strategy may be selectively implemented when the pressure differential between the pump pressure and the maximum load pressure is outside the preset margin range.

Figure 3:
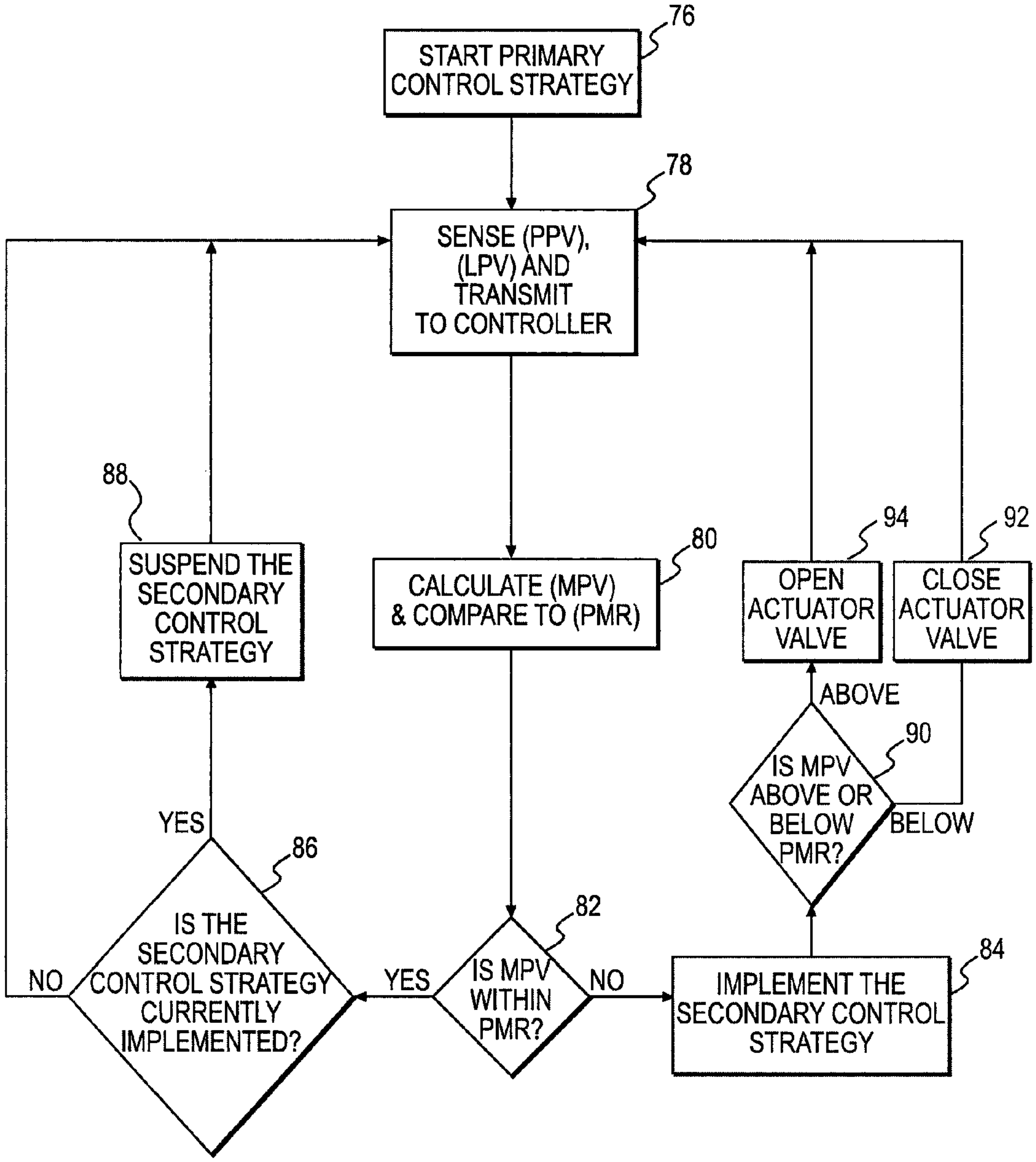
FIG. 3 is a flow diagram illustrating a method of operating the hydraulic control system of FIG. 2.

FIG. 3 shows a flow-diagram illustrating a method of controlling hydraulic system 24 by implementing primary and secondary control strategies. FIG. 3 will be discussed in detail in the following section.

INDUSTRIAL APPLICABILITY

The disclosed control system may be used in any machine where stable, reliable, and efficient hydraulic pressure control is a concern. The disclosed control system may regulate hydraulic fluid via a primary control strategy implementing pump control and a secondary control strategy implementing valve control. When a pressure differential between a pump pressure and a maximum load pressure are outside a preset margin range, the secondary control strategy may implement an actuator control system that may reduce the pressure differential to within the preset margin range. Operation of hydraulic control system 26 will now be described.

Regarding FIG. 3, control system 26 may begin regulation of the hydraulic system 24 at machine start-up. At start-up, the primary control strategy implementing pump control may be utilized (Step 76). Therefore, controller 56, after receiving input signals, may access the stored flow map to determine the required pump flow rate based on operator input device 22.

However, under certain conditions, the primary control strategy may be insufficient to meet system needs, and a secondary control strategy may be required. For example, when margin pressure closely approaches or exceeds the preset margin range (PMR), then a more responsive secondary control strategy may be required to meet the actuator pressure demands. Otherwise, hydraulic system 24 may not receive sufficient pump pressure to meet the maximum load of the hydraulic cylinders 36A-C.

In order to determine when the secondary control strategy may be required, various system inputs may be received by controller 56. For example, the pump pressure value (PPV) may be received from pump pressure sensor 64, and the maximum load pressure value (LPV) may be received from load pressure sensor 66. Pump pressure sensor 64 and load pressure sensor 66 may transmit the pump and the maximum load pressure values to controller 56 via communication lines 68 and 74, respectively (Step 78).

Controller 56 may calculate the margin pressure value (MPV) as a function of the difference between the maximum load pressure value and the pump pressure value, and compare the margin pressure value to the preset margin range (Step 80). Based on the comparison, controller 56 may determine if the margin pressure value is within the lower and upper range limits of the preset margin range (Step 82). For example, if the preset margin range includes a lower range limit of 500 KPa and an upper range limit of 2000 KPa, then a margin pressure value of 1100 KPa is within the preset margin range. As in this situation, when the margin pressure value is within the preset range, controller 56 may determine if the secondary control strategy is currently being implemented (Step 86). If the secondary control strategy is currently being implemented, then controller 56 may suspend the secondary control strategy (i.e., revert back to the primary control strategy), because it may no longer be needed (Step 88). Alternatively, instead of suspending the second control strategy when the margin pressure value is within the preset margin range, it may be desirable to maintain the secondary control strategy as currently implemented to ensure that the margin pressure value remains within the preset margin range. Once controller 56 suspends the secondary control strategy or identifies that the secondary control strategy is not currently implemented, then controller 56 may continuously repeat steps 78-82 to determine if the secondary control strategy is required in response to changes in control system inputs.

However, if the preset margin range includes a lower range limit of 500 KPa and an upper range limit of 2000 KPa, then a margin pressure value determined to be 300 KPa may be outside the preset margin range and controller 56 may implement the secondary control strategy (Step 84). More specifically, controller 56 may determine if the margin pressure value is above or below the preset margin range (Step 90). In this situation, a margin pressure value of 300 KPa is below the lower range limit of 500 KPa and it may be desirable to increase margin pressure in order to ensure system reliability and stability. In other words, it may be desirable to increase margin pressure in order to ensure and maintain flow sharing between the loads. In order to increase the margin pressure, controller 56 may instruct control valves 46 to move toward a closed position (Step 92). Additionally, if the margin pressure is above the upper range limit, it may be desirable to decrease margin pressure in order to increase system efficiency. In order to decrease the margin pressure, controller 56 may instruct control valves 46 to move toward an open position (Step 94). Once the secondary control strategy has been implemented, controller 56 may continuously repeat steps 78-82 to determine if the secondary control strategy is still required in response to changes in control system inputs.

Controller 56 may instruct control valves 46 to open or close in proportion to the amount the margin pressure value is outside the preset margin range. For example, if the margin pressure value is only 50 KPa above the preset margin range upper limit value, then controller valves 46 may open a small amount to decrease margin pressure. In contrast, if the margin pressure value is 600 KPa above the preset margin range upper limit value, then controller valves 46 may open a large amount to decrease margin pressure more quickly.

During normal operation, when the margin pressure value remains within the preset margin range, pump control via the primary control strategy may be sufficient to maintain reliable, stable, and efficient hydraulic system control. Deviation from normal operation may occur when system disturbances, such as friction or other efficiency losses, cause the flow map to identify an improper match between pump output with a given control valve position. In this situation, control valves 46 may be controlled independent of pump 30 to adjust margin pressure. It is contemplated that the primary control strategy may be continuously implemented throughout operation of the system. Therefore, it may be preferable that the secondary control strategy operate in parallel with the primary control strategy. Hence, the primary control strategy and the secondary control strategy may be implemented independent of each another. For example, even when the margin pressure valve is outside the preset margin range, pump control may simultaneously be implemented in accordance with the flow map based on operator and system inputs.

Implementation of independently operated pump and actuator control strategies may provide a reliable, stable, and efficient hydraulic system control. Most notably, actuator control may improve hydraulic system control efficiency by reducing margin pressure necessary to ensure sufficient operation of a plurality of actuators. Hence, in addition to providing additional reliability and stability available from dual control strategies, improved efficiency may also be available from actuator control that is more responsive than ordinary pump control.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. An actuator control system, comprising:
a pump;
at least one actuator configured to receive a flow of fluid from the pump;
an actuator valve configured to control the flow of fluid to the at least one actuator;
a pump pressure sensor configured to determine a pump pressure value;
a load pressure sensor configured to determine a load pressure value; and
a controller configured to:
receive the pump pressure value and the load pressure value;
determine a margin pressure value as a function of the difference between the pump pressure value and the load pressure value;
compare the margin pressure value to a preset margin, the preset margin including a lower limit and an upper limit; and
selectively control the actuator valve based on the comparison.

2. The system of claim 1, wherein the controller is configured to:
control the pump in accordance with a primary control strategy; and
selectively control the actuator valve based on the margin pressure value in accordance with a secondary control strategy.

3. The system of claim 2, wherein the controller is configured to determine a pump flow rate based on an operator input in accordance with the primary control strategy.

4. The system of claim 1, wherein the at least one actuator includes a plurality of actuators.

5. The system of claim 4, wherein the load pressure value is a maximum load pressure of the plurality of actuators.

6. The system of claim 1, wherein the controller is further configured to independently transmit commands to the pump and to the actuator valve.

7. The system of claim 1, wherein the controller is further configured to send a command to the actuator valve when the margin pressure value is outside the preset margin to selectively control the actuator valve.

8. The system of claim 1, wherein the controller is further configured to:
command the actuator valve to adjust towards a closed position to increase margin pressure when the margin pressure value is below the lower limit; and
command the actuator valve to adjust towards an open position to decrease margin pressure when the margin pressure value is above the upper limit.

9. The system of claim 1, wherein the controller is further configured to suspend control of the actuator valve when the margin pressure value is within the preset margin.

10. The system of claim 1, wherein the pump pressure value is based on a pressure of fluid exiting the pump, and the load pressure value is based on a pressure of fluid in the at least one actuator.

11. A method of controlling an actuator configured to receive a flow of fluid from a pump, the method comprising:
controlling an actuator valve to adjust the flow of fluid to the actuator;
sensing a pump pressure value;
sensing a load pressure value;
determining a margin pressure value as a function of a difference between the pump pressure value and the load pressure value;
comparing the margin pressure value to a preset margin, the preset margin including a lower limit and an upper limit; and
selectively controlling the actuator valve based on the comparison.

12. The method of claim 11, wherein controlling the actuator valve includes:
restricting the flow of fluid to the actuator to increase margin pressure when the margin pressure value is below the lower limit; and
increasing the flow of fluid to the actuator to decrease margin pressure when the margin pressure value is above the upper limit.

13. The method of claim 11, wherein the actuator valve is selectively controlled when the margin pressure value is outside the preset margin.

14. The method of claim 13, further comprising suspending control of the actuator valve when the margin pressure is within the preset margin.

15. The method of claim 11, further comprising controlling the pump in accordance with a primary control strategy, wherein the actuator valve is selectively controlled based on the comparison in accordance with a secondary control strategy, and the primary and secondary control strategies are independently implemented in parallel.

16. The method of claim 11, wherein the pump pressure value is sensed using a pump pressure sensor and the load pressure value is sensed using a load pressure sensor.

17. A machine, comprising;
a power source;
at least one work implement;
a tank configured to hold a supply of fluid;
a pump connected to the power source and configured to pressurize the fluid;
a plurality of actuators configured to receive the pressurized fluid and move the at least one work implement;
a control valve associated with each of the plurality of actuators and configured to regulate the pressurized fluid;
a pump pressure sensor configured to determine a pump pressure value;
a load pressure sensor configured to determine a maximum load pressure value of the plurality of actuators; and
a controller configured to:
receive the pump pressure value and the load pressure value;
calculate a margin pressure value as the difference between the pump pressure value and the load pressure value;
implement a primary control strategy by transmitting commands to the pump;
compare the margin pressure value to a margin range, wherein the margin range includes a lower range limit and an upper range limit; and
selectively implement a secondary control strategy by transmitting commands to the control valve when the margin pressure value is outside the margin range.

18. The machine of claim 17, wherein the controller is further configured to:
command the control valve to at least partially close to increase margin pressure when the margin pressure value is below the lower range limit; and
command the control valve to at least partially open to decrease margin pressure when the margin pressure value exceeds the upper range limit.

* * * * *